(12) United States Patent
Erickson et al.

(10) Patent No.: US 12,417,313 B1
(45) Date of Patent: Sep. 16, 2025

(54) SYSTEM AND METHODS FOR DATA ANONYMITY TRACKBACK MITIGATION

(71) Applicant: United Services Automobile Association (USAA), San Antonio, TX (US)

(72) Inventors: Jennifer Hunt Erickson, San Antonio, TX (US); Jeanie Graciela Lopez, San Antonio, TX (US); Donald Nathaniel Holloway, III, San Antonio, TX (US); Christian A. Williams, San Antonio, TX (US); Joel S. Hartshorn, Port Orchard, WA (US); Will Kerns Maney, San Antonio, TX (US); Mark Paxman Warnick, San Antonio, TX (US); Ravi Durairaj, San Antonio, TX (US); Sumita T. Jonak, San Antonio, TX (US); Nolan Serrao, Plano, TX (US); Elena Marie Carrasco, Converse, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 174 days.

(21) Appl. No.: 18/113,452

(22) Filed: Feb. 23, 2023

Related U.S. Application Data

(60) Provisional application No. 63/314,124, filed on Feb. 25, 2022.

(51) Int. Cl.
*G06F 21/78* (2013.01)
*G06F 21/62* (2013.01)
(Continued)

(52) U.S. Cl.
CPC ........ *G06F 21/6254* (2013.01); *G06F 21/645* (2013.01); *G06F 21/78* (2013.01); *G06F 21/121* (2013.01)

(58) Field of Classification Search
CPC .... G06F 21/6254; G06F 21/645; G06F 21/62; G06F 21/78; G06F 21/88; G06F 21/73; G06F 21/75; G06F 21/121
(Continued)

(56) References Cited

U.S. PATENT DOCUMENTS 9,065,727 B1 * 6/2015 Liu .................. H04L 43/04
2014/0013065 A1 * 1/2014 Arakawa .............. G06F 3/0644
711/154
(Continued)

FOREIGN PATENT DOCUMENTS

CA 2883809 A1 * 3/2014 ......... H04L 12/4645
CA 3073459 C * 7/2023 ............... G06F 9/54

*Primary Examiner* — Khanh Q Dinh
(74) *Attorney, Agent, or Firm* — Fletcher Yoder, P.C.

(57) ABSTRACT

The techniques provided herein may be used to reversibly anonymize data and to mitigate possible de-anonymization the data by third parties. Specifically, a reverse anonymity data sharing service is used to anonymize personal data by replacing confidential information found in the data with unique identifiers. A reverse anonymity data store is used to store the unique identifiers with the information they replaced such that the anonymization may be reversed if needed. Machine learning models are used to prevent traceback, using publicly available data sources, of the anonymized data to it's the individual who generated the data or whom the data is about.

20 Claims, 3 Drawing Sheets

(51) Int. Cl.
*G06F 21/64* (2013.01)
*G06F 21/12* (2013.01)

(58) Field of Classification Search
USPC .......................................... 709/220, 224–228
See application file for complete search history.

(56) References Cited

U.S. PATENT DOCUMENTS

| | | | |
|---|---|---|---|
| 2015/0287416 A1* | 10/2015 | Brands | H04L 9/3231 |
| | | | 704/273 |
| 2016/0191970 A1* | 6/2016 | Sheppard | G06F 17/18 |
| | | | 725/14 |
| 2017/0034160 A1* | 2/2017 | Brands | H04M 3/56 |
| 2019/0089711 A1* | 3/2019 | Faulkner | H04L 63/1433 |
| 2019/0370866 A1* | 12/2019 | Lawbaugh | G06Q 30/0277 |
| 2021/0026982 A1* | 1/2021 | Amarendran | G06F 21/6254 |
| 2021/0136047 A1* | 5/2021 | Wilson | H04L 9/0861 |
| 2021/0391096 A1* | 12/2021 | Ziegler | H01F 27/323 |

* cited by examiner

SYSTEM AND METHODS FOR DATA ANONYMITY TRACKBACK MITIGATION

CROSS-REFERENCE TO RELATED APPLICATION

The present application claims priority to and the benefit of U.S. Provisional Application No. 63/314,124, entitled "SYSTEM AND METHODS FOR DATA ANONYMITY TRACKBACK MITIGATION" and filed on Feb. 25, 2022, the disclosure of which is incorporated by reference herein in its entirety for all purposes.

BACKGROUND

This present disclosure relates generally to data anonymization systems and methods.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Advances in technologies for data collection, storage and sharing has led to the existence of a large and growing pool of publicly available data. In some cases, such publically available data can used to de-anonymize datasets and to uncover the identities of the individuals who generated the data. The techniques provided herein may be used to reversibly anonymize data and to mitigate possible de-anonymization the data by third parties.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
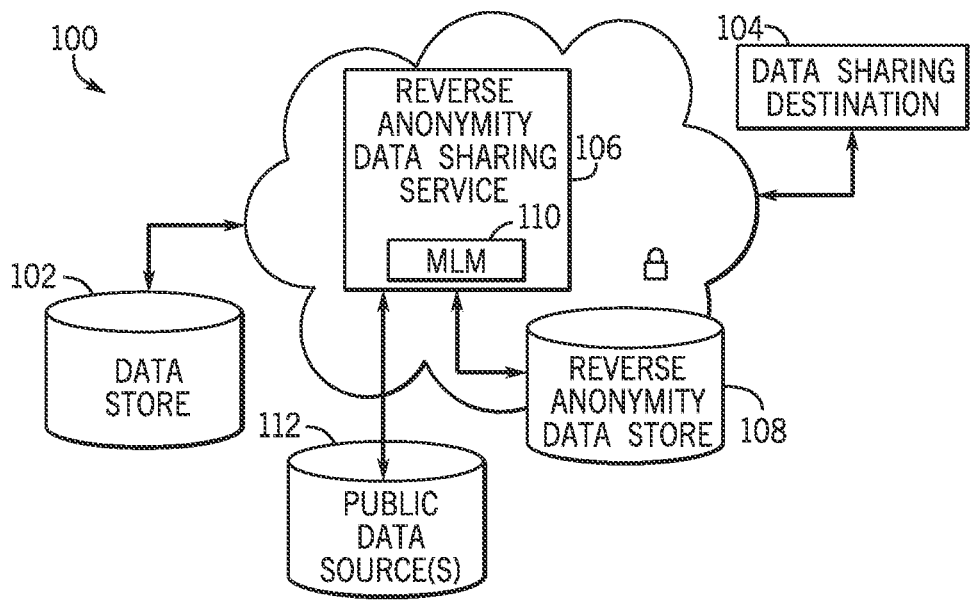
FIG. 1 is a schematic diagram of a data sharing system that is capable of reversibly anonymizing data, in accordance with certain embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Techniques provided herein employ a reverse anonymity data sharing service to anonymize personal data by replacing identifying/confidential information found in the data with unique identifiers such that the anonymization may be reversed if needed. Machine learning models are used to prevent traceback of the anonymized data to its original source (e.g., a person who generated the data or whom the data is about) by recognizing the information that can be used to identify the individual/source and anonymizing it.

For example, mobile application on a smartphone may, with a user's permission, collect the location data of the user. The collected data may include all the places that the user has visited or passed through as well as the corresponding timestamps. Even though the identity (e.g., name, social security number, passport number, driver's license number) of the user is anonymized in the data, it may be possible find out the identity of the user based on the locations that the user visits regularly, which are revealed by the data. For example, the location data may reveal the address of the user's residence, as it is likely the location the user comes back to every night. Public records may be used to find out who lives at that particular address. Moreover, from the data, it may be possible to determine where the user works. From website(s) of organization(s) located at the possible work address, names of employees may be found. The names of people associated with a home address may be compared with the names of employees associated with the work address to find the exact name of the user. The techniques provided herein may anonymize the user's data by replacing the user's identity with a unique identifier. Additionally, the techniques provided herein may use machine learning models to determine whether certain information (e.g., location data, address, and/or workplace) that may not provide an identity independently may be combined with other information to reveal the user's identity (or at least increase a likelihood of identification). If so, the techniques provided herein may anonymize those pieces of location data that may reveal the user's identity and other confidential information or prevent the location data from being shared.

FIG. 1 is a schematic diagram of a data sharing system that is capable of reversibly anonymizing data, in accordance with certain embodiments described herein. The data is stored in a data store 102. The data in the data store 102 may be collected by institutions such as banks, insurance companies, payment processing services, hospitals, social media networks, and any other entities that may collect its customer's information. In addition, the data stored in a data store 102 may be generated by individuals/customers (e.g., data sources). In some embodiments, the data may be generated by the individuals taking certain actions such as making purchases on a credit card. The data stored in the data store 102 may be shared with a data-sharing destination 104. The data-sharing destination may include the institutions' commercial partners, various marketers and publicists, government agencies, auditors, etc.

When data is shared, it is processed through a reverse anonymity data sharing service 106 that identifies confidential portions of data (e.g. portions to anonymize) and replaces these portions with unique identifiers. In an embodiment, the unique identifiers are randomly generated alphanumeric strings. Each unique identifier and the piece of confidential information that it replaces are stored in a reverse anonymity data store 108. In an embodiment, the reverse anonymity data store 108 may contain a mapping table that maps each unique identifier to the corresponding piece of confidential information. In an embodiment, the reverse anonymity data store 108 may include a highly secure database that is protected using security measures like data encryption, secure access authentication, database firewall, real-time database monitoring and proxy servers. The information stored in the reverse anonymity data store 108 may be used to reverse the anonymity of the shared data to prove the authenticity of the data (e.g., prove that the data is not fabricated or fake).

The reverse anonymity data sharing service includes machine learning models 110 that may access public data sources 112 in order to determine whether the anonymized data may be uncovered based upon provided information. The anonymized data might include, for example, the identity of the individual who the provided data pertains to.

For example, the reverse anonymity data sharing service 106 may anonymize a set of data containing financial transactions on a credit card by replacing a credit card number and a name of the credit card user with unique identifiers. However, in certain cases, the financial transactions on the credit card may reveal the credit card user's identity (e.g., identity of the data source). The reverse anonymity data sharing service 106 would pass the anonymized credit card transactions data subset to the machine learning models 110 to determine whether the credit card transactions reveal the credit card user's identity. The machine learning models 110 may access public data sources 112 such as business directories in order to determine locations of the businesses where the credit card transactions took place as well as the types of businesses where the credit card transactions took place.

The types of businesses where the transactions took place may reveal information about the credit card's user. For example, if some of the credit card transactions come from a toy store or a nursery, the credit card user may have a young child. Furthermore, the locations of businesses where the transactions took place may reveal that the credit card user lives in a rural area or a small town where, statistically, few persons/families are likely to have children. Based on this information, the machine learning models 110 may calculate the probability that the identity of the credit card user is discoverable. In addition, the machine learning models 110 may access additional public data sources 112 such as news media, social media, and websites of local organizations, to determine the identity of the credit card user.

If the machine learning models 110 determine that the information found in the anonymized data subset may be used to discover the identity of the data source (e.g., the individual who generated the data), then the data may be additionally anonymized to obscure identifying/confidential information. In an embodiment, the additional anonymization by the machine learning models 110 may include replacement of the identifying information (e.g., information that is likely to lead to the discovery of the source's identity) with a unique identifier. In an embodiment, the additional anonymization by the machine learning models 110 may include deletion of the identifying information. For example, the machine learning models 110 may identify that transactions that took place at the toy store may be used to discover the credit card user's identity. In response, the machine learning models 110 may remove the transactions that took place at the toy store from the credit card transactions data subset.

Figure 2:
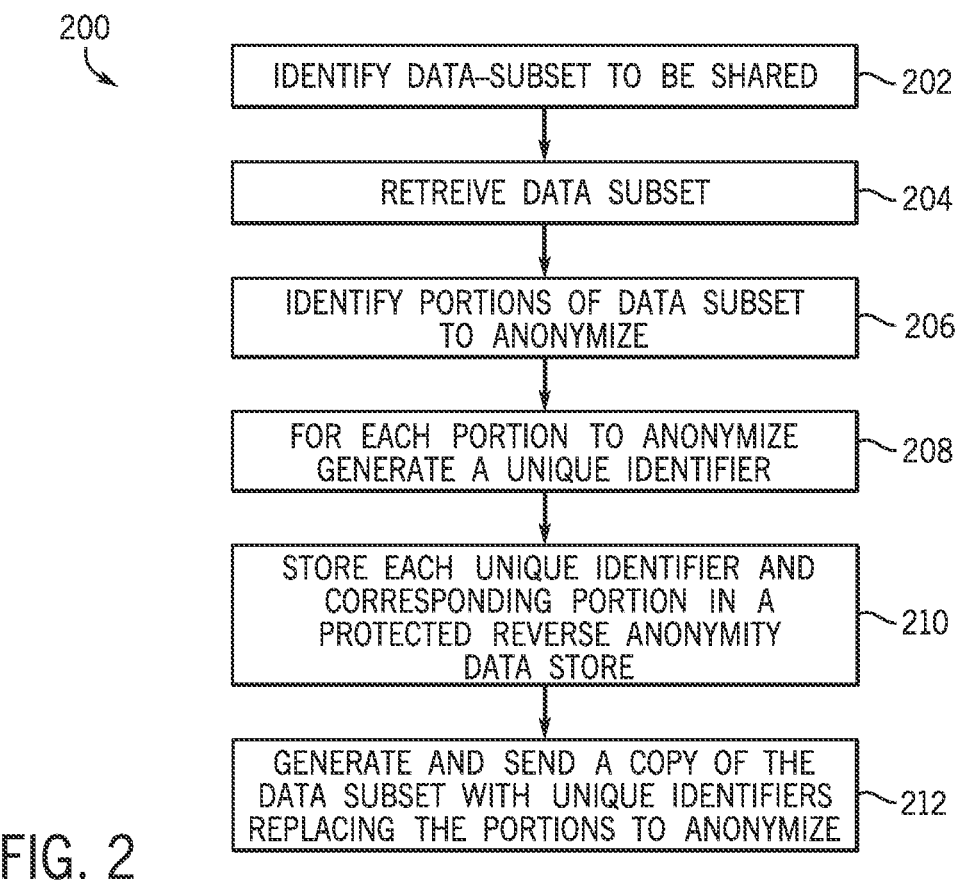
FIG. 2 is a flow chart, illustrating a process of reversibly anonymizing the data, in accordance with certain embodiments described herein.

Turning now to a more detailed discussion of the data characterization process, FIG. 2 is a flow chart illustrating a process 200 of anonymizing the data such that the anonymization may be reversed, in accordance with certain embodiments described herein. The process 200 of data anonymization begins with identifying a subset of data to be shared (block 202). The subset of data to be shared comes from the data store 102 and can be identified based on a number of factors. In some embodiments, the subset of data to be shared may be a new subset of data that has recently been collected and has not yet been shared. In other embodiments, the data recipient (e.g., data sharing destination 104) may request specific types of data and the data having the requested characteristics will be identified.

After the data subset to be shared has been identified, the data subset to be shared is retrieved (block 204). The retrieval may involve the reverse anonymity data sharing service 106 receiving the subset of data from the data store 102 for processing. For example, the subset of data retrieved may include credit card transactions of a particular user during a particular time period. In another example, the subset of data retrieved may be the location data of a smartphone as tracked by one of its mobile applications.

Once a subset of data has been retrieved, portions of data subset to anonymize are identified (block 206). The portions of data to anonymize may include any confidential information and/or information that readily reveals the identity of the person who generated the data. For example, the portions of data to anonymize may include names, usernames, or social security numbers, passport numbers, birth days, zip codes, addresses, etc. For example, when credit card transaction data is shared, the credit card number and name on the credit card may be identified as the portions of data to anonymize. When the GPS location of a phone is shared, the name of the phone's user and information about the phone may be identified as the portions of data to anonymize.

For each portion of data to anonymize, a unique identifier is generated (block 208). The unique identifier may be a numeric or alphanumeric string that does not reveal information about the portion to anonymize. In addition, there is a one-to-one mapping between the unique identifiers and the corresponding portions to anonymize so that no two unique identifiers correspond to the same portion to anonymize. Further, by randomizing the unique identifiers, it may be more difficult to glean information from these identifiers. For example, if sequential unique identifiers were used, a relative time of anonymization may be discerned.

After the unique identifiers are generated for each portion to anonymize, the unique identifier and the corresponding portion to anonymize are stored in a protected reverse anonymity data store 108 (block 210). The reverse anonymity data store 108 may be protected by security measures like data encryption, secure access authentication, database firewall, real-time database monitoring and proxy servers. Since each unique identifier corresponds to an anonymized piece of information, the information stored in the reverse anonymity database 108 may be used to reverse the anonymity of the shared data.

After the unique identifiers and the corresponding data portions have been stored in the reverse anonymity data store 108, a copy of the data subset (e.g., anonymized subset) with unique identifiers replacing the portions to anonymize is generated and sent for further processing and/or consumption (block 212). In this manner, data may be shared, while not divulging private and/or identifying data. Further, by maintaining the reverse anonymity data, auditing of the shared data may be facilitated from time to time.

Figure 3:
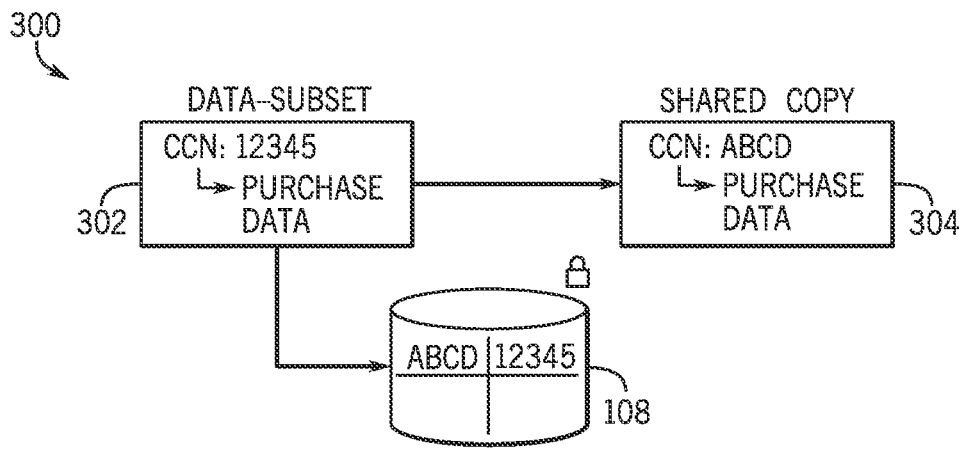
FIG. 3 is a schematic diagram illustrating an example of anonymization of a subset of credit card transactions data, in accordance with certain embodiments described herein.

An example 300 of the anonymization of credit card transactions data is shown in FIG. 3. FIG. 3 is a schematic diagram of anonymization of a subset of credit card transactions data, in accordance with certain embodiments described herein. The data subset to be shared 302 includes a credit card number (e.g., CCN: 12345) and purchase data. The purchase data may include information like the amounts of money spent on purchases, the dates and times of the purchases, as well as the names of the vendors where the purchases were made. The credit card number is confidential information as it may be used to make unauthorized purchases on the card. Thus, the credit card number is identified as a portion to anonymize. A unique identifier (e.g., ABCD) is generated for the credit card number and stored along with the credit card number in the protected reverse anonymity data store 108. The reverse anonymity data store may have a data table or a database where the credit card number and the unique identifier are stored together (e.g., ABCD: 12345). Then, a new copy of the data subset 304 is created where the credit card number is replaced with the unique identifier (e.g., CCN: ABCD). This new copy 304, which contains the unique identifier of the credit card number as well as the original purchase data, is sent for further processing by the machine learning models 110 or for sharing.

Figure 4:
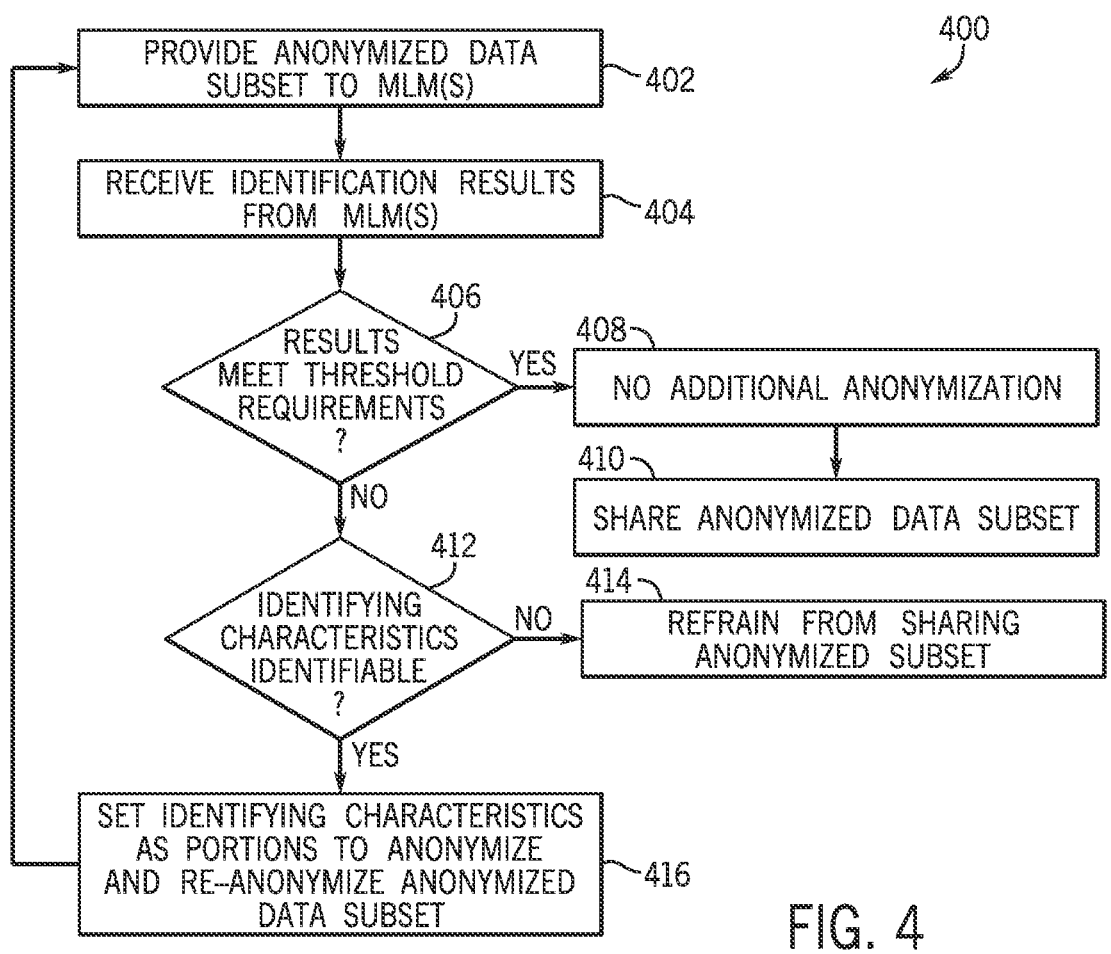
FIG. 4 is a flow chart, illustrating a process of mitigating the possibility of, using publically available data sources, reversing the anonymization, in accordance with certain embodiments described herein.

After the identifying/confidential information is anonymized, the machine learning models 110 are used to identify information that, in combination with the publically available data, may reveal the data source/individual who generated the data. FIG. 4 is a flow chart, illustrating a process 400 of mitigating the possibility of reversing the anonymization using publically available data sources, in accordance with certain embodiments described herein. By performing this process 400 after process 200, the process 400 may act as an anonymization verification for the process 200, where a reduced amount of subsequent anonymization may be performed, while attempting to ensure that the anonymized data is non-identifying. For example, if process 400 were performed before process 200, more identifying information may be received by the machine learning models, making it easier to identify persons from the data. Accordingly, unnecessary anonymization may occur, reducing value of the data. However, in some embodiments, process 400 may be independently executed or executed prior to process 200 (e.g., to increase security of the data, increase processing efficiency by reducing a number of processes to complete, etc.).

The process 400 begins with providing the anonymized data subset to machine learning models 110 for processing (block 402). As mentioned, the data subset (e.g., anonymized data subset) provided to the machine learning models 110 may have certain confidential pieces of information already anonymized (e.g., replaced with the unique identifier). The machine learning models 110 are used to determine whether the identity (e.g., name, social security number, driver's license number, and passport number) of the individual who generated the data is discoverable using public data sources 112 and the anonymized data.

Based on the information found in the anonymized data, the machine learning models 110 may identify certain dependency identifying characteristics (e.g., home address, place of work, hobbies, pets, medical conditions) of the unknown individual who generated the data (e.g., the data source). Taken together, these characteristics form a profile of the data source. The machine learning models 110 may attempt to find out whether the identity (e.g., name, social security number, driver's license number, passport number) of an individual who matches (or matches within certain probability threshold) the profile is discoverable using public data sources 112. To do that, the machine learning models 110 may find the identity of the individual who matches the profile and/or find the identity of a subset of persons less than a threshold number of persons. For example, by analyzing the anonymized data of an unknown individual the machine learning models 110 may construct a profile that includes the following characteristics: living within a mile radius of a particular address, being male, owning a dog, and vacationing in Florida. If the address is in a densely populated city, hundreds of people could match the profile. In this case, even if the machine learning models 110 find identities of half of the people who match the profile, the likelihood that a particular identity belongs to the data source is low. On the other hand, if the address is in a rural area, there may be only a single person who matches the profile. In this case, if the identity of the individual who matches the profile is discovered, there is a high chance that this individual is the source of data. In addition, it is possible that the identity/identities of the individual/individuals who match the profile cannot be determined due to not being available in public data sources 112.

After the data subset is provided to the machine learning models 110, the identification results from the machine learning models 110 are received (block 404). In an embodiment, the identification results include the identity of the individual who matches the profile as well as a numeric score of the likelihood that the individual with the identity generated the data. In an embodiment, the identification results include multiple identities of the individuals who match the profile as well as numeric scores of the likelihoods that the individuals with the identities generated the data. The numeric score may be based on factors such as the number of individuals who match the profile, the number of identities that match the profile, the reliability of the public data sources 112 used to determine the identity. For example, if there are 20 individuals who matched the profile but only one identity was found, the likelihood that the identity belongs to the data source is low. Thus, the assigned numeric score is low. In another example, if an identity of an individual who matches the profile is a common name (e.g., there are thousands of people with the common name), the numeric score assigned to this identity may also be low as the identity is not representative of a single person.

In order for the match between an identity and the data source to be considered valid, the identification results may need to match a certain number of characteristics to filter down candidate matches. A threshold requirement for anonymity may include a requirement that a number of possible candidates derived from the data exceeds a certain threshold value (e.g., there are enough candidates to consider the data provision to be anonymous without further anonymization). If the identification results meet the threshold requirements (block 406) (e.g., a numeric score indicative of a likelihood that the data indicates a particular person is below a threshold value and/or a number of candidates is not reduced below a threshold value based upon the information provided), then the no additional anonymization of the data subset is needed (block 408) and the anonymized data subset is shared (block 410). As mentioned herein, the thresholding may relate to a specific level of certainty in identifying a person, a specific level of certainty in identifying the data as pertaining to a subset of persons less than a threshold number of persons, etc.

If, however, the identification results do not meet the threshold requirements (e.g., the score is equal to or above the threshold value), then identifying characteristics (e.g., specific characteristics that reveal the identity of the individual) need to be identified in the data subset. The identifying characteristics in the data subset may be identified using the machine learning models 110. The identifying characteristics are specific characteristics that contributed to the identification of the identity of the data source more than other characteristics did. For example, if an identity of the data source was recognized based on characteristics such as having a rare health condition and owning a dog, the rare health condition is likely to be the identifying characteristic as it is less common then owning a dog. However, in some cases, the identifying characteristics may not be identifiable. For example, a data source could be identified from a combination of a large number common characteristics like owning a dog, driving a pickup truck, liking Italian food etc. If all the characteristics are equally likely to lead to the identification of the data source, then no identifying characteristics may be identified.

If the identifying characteristics are identifiable (block 412), then the data subset is additionally anonymized and the identifying characteristics are set as portions to anonymize (block 416). If this happens, all the pieces of data in the data subset that relate to the identifying characteristics are either deleted from the data subset or replaced with a unique identifier. For example, if a rare health condition has been identified as an identifying characteristic in a data subset that contains browser search data, then the all the search queries related to doctors, medicines, and symptoms for the health condition may be deleted/replaced in the data subset. The re-anonymized data subset in then provided to the machine learning models 110 for re-evaluation (e.g., the steps in blocks 402-416 are repeated). The data is only shared if the identification results output by the machine learning models 110 meet the threshold requirements (e.g., the likelihood of a match between data and an data source is below the threshold value). If the identifying characteristics could not be identified by the machine learning models 110, the data subset is not shared (block 414) in order to avoid exposing the data source.

If multiple pieces of data lead to the identification, the data to be removed may be selected in a piecemeal/iterative fashion until just enough additional data is anonymized to meet the threshold requirements. In some embodiments, the piecemeal approach may begin with pieces of data that the machine learning models found to be weighted high in the identification. In some embodiments, the piecemeal approach may avoid specific data that was indicated as important by the requestor, until only this information is left and more anonymization is still required to meet the threshold requirements.

Figure 5:
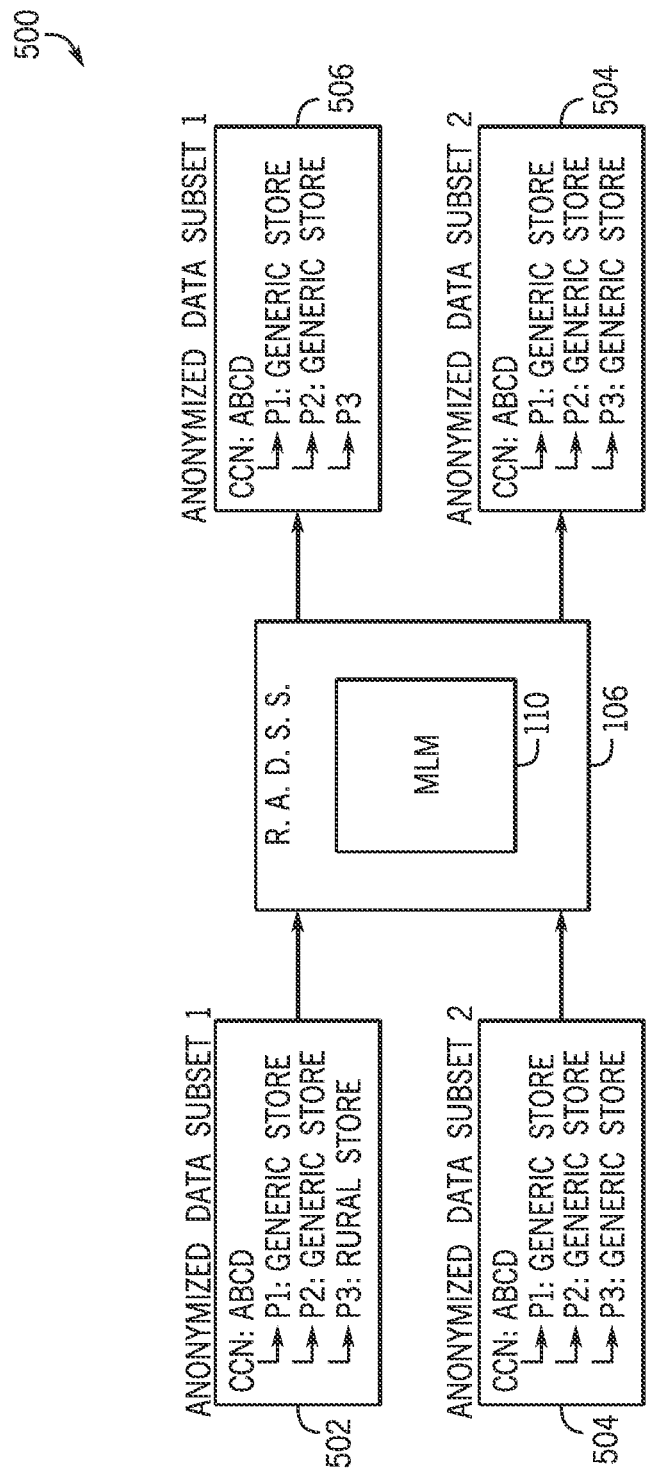
FIG. 5 is a schematic diagram of trace back mitigation of subsets of data where identifying/confidential characteristics have been identified and removed, in accordance with certain embodiments described herein.

FIG. 5 is a schematic diagram illustrating an example 500 of trace back mitigation of subsets of credit card transactions data where identifying characteristics have been identified and removed, in accordance with certain embodiments described herein. FIG. 5 shows how two different anonymized credit card transactions data subsets are changed after they are processed by the machine learning models 110 of the reverse anonymity data sharing service 106. As discussed earlier, credit card purchases may reveal certain characteristics about the purchaser based on where, at what businesses, and when the purchases were made.

The anonymized data subset 1 502 contains transactions from a generic store (e.g., a common store where many people shop) and from a rural store (e.g., a store where only a small number of people shop). The transaction at the rural store may help reveal the identity of the individual who made the transaction. Thus, when the anonymized data subset 1 502 passes through the reverse anonymity data sharing services 106, the machine learning models 110 identify the transaction at the rural store as the identifying characteristic and set it as the portion to anonymize. After being output from the reverse anonymity data sharing services 106, the re-anonymized data subset one 506 may have the rural store transaction removed or replaced by a unique identifier as shown in FIG. 5.

The anonymized data subset 2 504 has only transactions from generic stores. Transactions from generic stores could belong to a millions of people, so they do not help reveal the identity of the credit card holder. Thus, no additional anonymization is performed on the anonymized data subset 2 504 beyond the initial replacement of the credit card number with a unique identifier. The anonymized data subset 2 504 is shared after being processed by the machine learning models 110 without undergoing modifications.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform) ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system, comprising:
a reverse anonymity data sharing service, configured to:
receive a data subset;
in response to receiving the data subset:
identify a portion of the data subset to anonymize;
for the portion of the data subset to anonymize, generate a unique identifier and replace a payload of the portion of the data subset to anonymize with the unique identifier, generating an anonymized data subset;
a reverse anonymity data store, configured to:
store the payload of the portion of the data subset to anonymize and an association to the unique identifier;

machine learning models, configured to:
receive the anonymized data subset; and
determine whether an anonymized portion of the portion of the data subset is identifiable within an identification threshold; and
wherein the reverse anonymity data sharing service is configured further to:
when the anonymized portion is identifiable within the identification threshold, further anonymize the anonymized data subset.

2. The system of claim 1, wherein the reverse anonymity data sharing service is configured to determine whether the anonymized portion of the data subset is identifiable within the identification threshold by accessing external public identifying information that, when supplementing the anonymized portion, helps determine the identity of the anonymized portion of the portion of the data subset.

3. The system of claim 1, wherein the reverse anonymity data sharing service is configured to:
iteratively anonymize additional anonymized portions of the data subset until the anonymized data subset is not identifiable within the identification threshold.

4. The system of claim 3, wherein the reverse anonymity data sharing service is configured to:
prioritize selection of portions of the data subset to be anonymized in the additional anonymized portions based upon not specifically being data requested by a requestor of the data subset.

5. The system of claim 3, wherein the reverse anonymity data sharing service is configured to:
prioritize selection of portions of the data subset to be anonymized in the additional anonymized portions based upon providing a relatively larger contribution to making the anonymized portion identifiable within the identification threshold.

6. The system of claim 1, wherein the reverse data anonymity sharing service is configured to:
refrain from sharing the anonymized portion when the anonymized portion is identifiable within the identification threshold; and
otherwise, share the anonymized portion when the anonymized portion is not identifiable within the identification threshold.

7. The system of claim 1, wherein the identification threshold specifies a minimum number of identification candidates that may be identified from the anonymized data subset.

8. The system of claim 1, wherein the identification threshold specifies a maximum identification probability that the anonymized data subset provides.

9. A computer-implemented method, comprising:
receiving a data subset to be shared;
in response to receiving the data subset, anonymizing the data subset into an anonymized data subset, by:
identifying a portion of the data subset to anonymize; and
for the portion of the data subset to anonymize, generating a unique identifier and replace a payload of the portion of the data subset to anonymize with the unique identifier, generating an anonymized portion of the data subset;
storing the payload of the portion of the data subset and an association to the unique identifier in a data store;
determining whether an anonymized portion of the data subset is identifiable within an identification threshold; and
refraining from sharing the anonymized data subset when the anonymized data subset is identifiable within the identification threshold.

10. The computer-implemented method of claim 9, comprising:
further iteratively anonymizing the anonymized data subset in a piecemeal approach until the anonymized data subset is not identifiable within the identification threshold.

11. The computer-implemented method of claim 10, comprising:
prioritizing piecemeal portions of the anonymized data subset to further anonymized based upon not specifically pertaining to data requested by a requestor of the data subset.

12. The computer-implemented method of claim 10, comprising:
prioritizing piecemeal portions of the anonymized data subset to further anonymized based upon the piecemeal portions providing a relatively larger contribution to making the anonymized data subset identifiable within the identification threshold.

13. The computer-implemented method of claim 9, comprising:
determining whether the anonymized data subset is identifiable within the identification threshold by accessing external public identifying information that, when supplementing the anonymized portion, helps identity the anonymized portion.

14. The computer-implemented method of claim 9, comprising:
sharing the anonymized data subset when the anonymized portion is not identifiable within the identification threshold.

15. The computer-implemented method of claim 9, wherein the identification threshold specifies a minimum number of identification candidates that may be identified from the anonymized data subset, a maximum identification probability that the anonymized data subset provides, or both.

16. A tangible, non-transitory, computer-readable medium, comprising computer-readable instructions that, when executed by one or more processors of one or more computers, cause the one or more computers to:
receive a data subset to be shared;
in response to receiving the data subset, anonymize the data subset into an anonymized data subset, by:
identifying a portion of the data subset to anonymize; and
for the portion of the data subset to anonymize, generating a unique identifier and replace a payload of the portion of the data subset to anonymize with the unique identifier, generating an anonymized portion of the data subset;
store the payload of the portion of the data subset and an association to the unique identifier in a data store;
determine whether an anonymized portion of the data subset is identifiable within an identification threshold;
refrain from sharing the anonymized data subset when the anonymized data subset is identifiable within the identification threshold; and
share the anonymized data subset when the anonymized data subset is not identifiable within the identification threshold.

17. The tangible, non-transitory, computer-readable medium of claim 16, comprising computer-readable instructions that, when executed by one or more processors of one or more computers, cause the one or more computers to:
further iteratively anonymize the anonymized data subset in a piecemeal approach until the anonymized data subset is not identifiable within the identification threshold.

18. The tangible, non-transitory, computer-readable medium of claim 17, comprising computer-readable instructions that, when executed by one or more processors of one or more computers, cause the one or more computers to:
prioritize piecemeal portions of the anonymized data subset to further anonymized based upon:
the piecemeal portions not specifically pertaining to data requested by a requestor of the data subset;
the piecemeal portions providing a relatively larger contribution to making the anonymized data subset identifiable within the identification threshold; or both.

19. The tangible, non-transitory, computer-readable medium of claim 16, comprising computer-readable instructions that, when executed by one or more processors of one or more computers, cause the one or more computers to:
determine whether the anonymized data subset is identifiable within the identification threshold by accessing external public identifying information that, when supplementing the anonymized portion, helps identity the anonymized portion.

20. The tangible, non-transitory, computer-readable medium of claim 16, wherein the identification threshold specifies a minimum number of identification candidates that may be identified from the anonymized data subset, a maximum identification probability that the anonymized data subset provides, or both.

* * * * *